United States Patent [19]

Olsen

[11] 4,312,516
[45] Jan. 26, 1982

[54] TRAILER HITCH

[76] Inventor: Gary E. Olsen, Cerritos, Calif.

[21] Appl. No.: 76,066

[22] Filed: Sep. 17, 1979

Related U.S. Application Data

[63] Continuation-in-part of Ser. No. 943,448, Sep. 18, 1978, Pat. No. 4,198,073.

[51] Int. Cl.³ .............................................. B62D 53/00
[52] U.S. Cl. .............................. 280/406 A; 280/446 B
[58] Field of Search ........... 280/405 R, 405 A, 405 B, 280/406 R, 406 A, 446 R, 446 B, 477, 492, 515

[56] References Cited

U.S. PATENT DOCUMENTS 2,579,232 12/1951 Hansen ................................. 280/515
2,772,893 12/1956 Wettstein ........................ 280/406 A
3,633,939 1/1972 Evernham .................. 280/446 B X
3,891,237 6/1975 Allen ..................................... 280/477
3,900,212 8/1975 Ewing ............................. 280/406 A Primary Examiner—Joseph F. Peters, Jr.
Assistant Examiner—Randall A. Schrecengost
Attorney, Agent, or Firm—William W. Haefliger

[57] ABSTRACT

A trailer hitch embodies simple weight adjustment and trailer side sway control. In addition, up-down motion transmission between the towing vehicle and trailer is dampened; a safety stem and receptacle interconnects the hitch and towing vehicle; a safety latch connects the stem and receptacle; and a retractable safety line is provided for a safety pin that interconnects the stem and receptacle.

14 Claims, 14 Drawing Figures

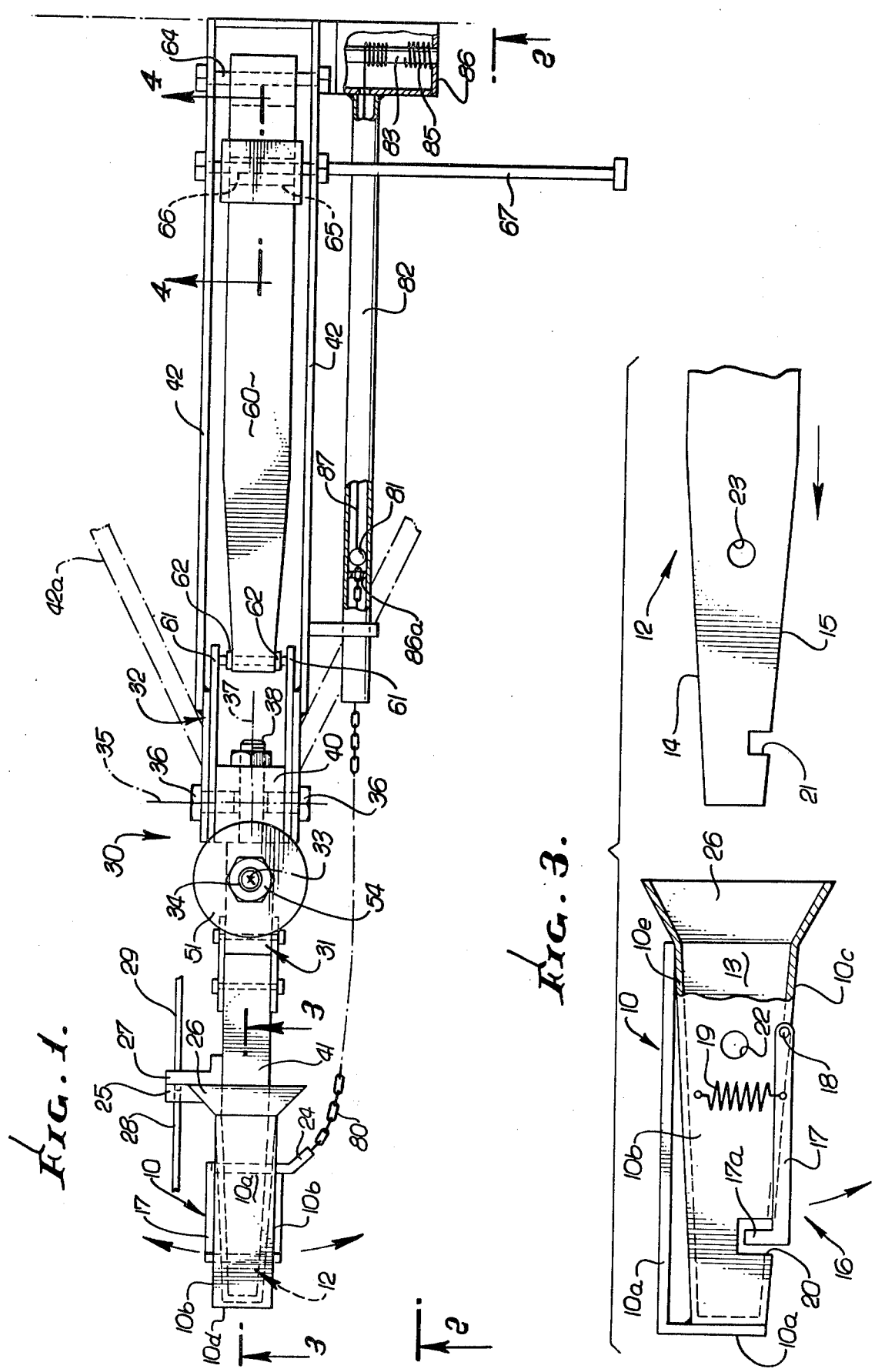

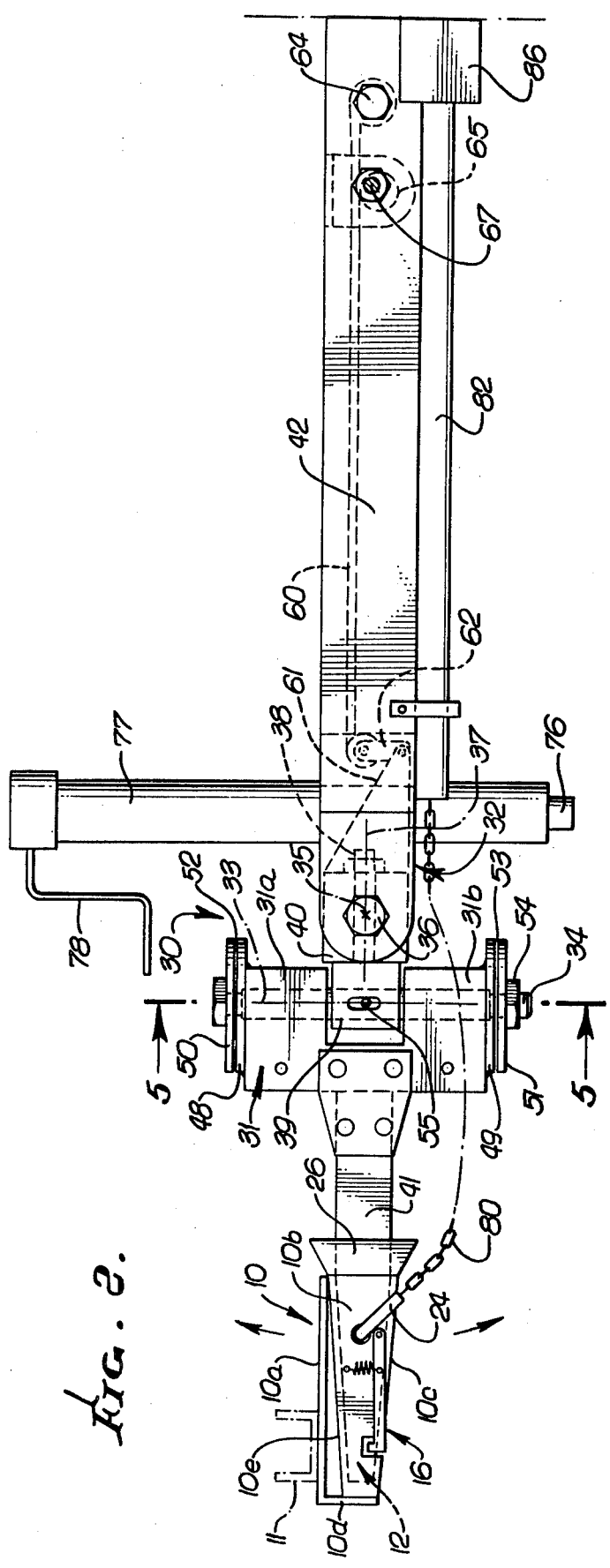
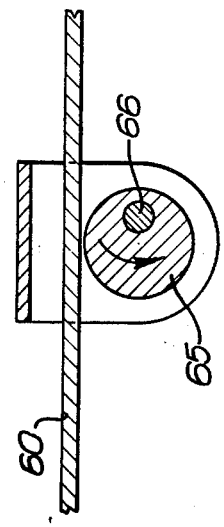

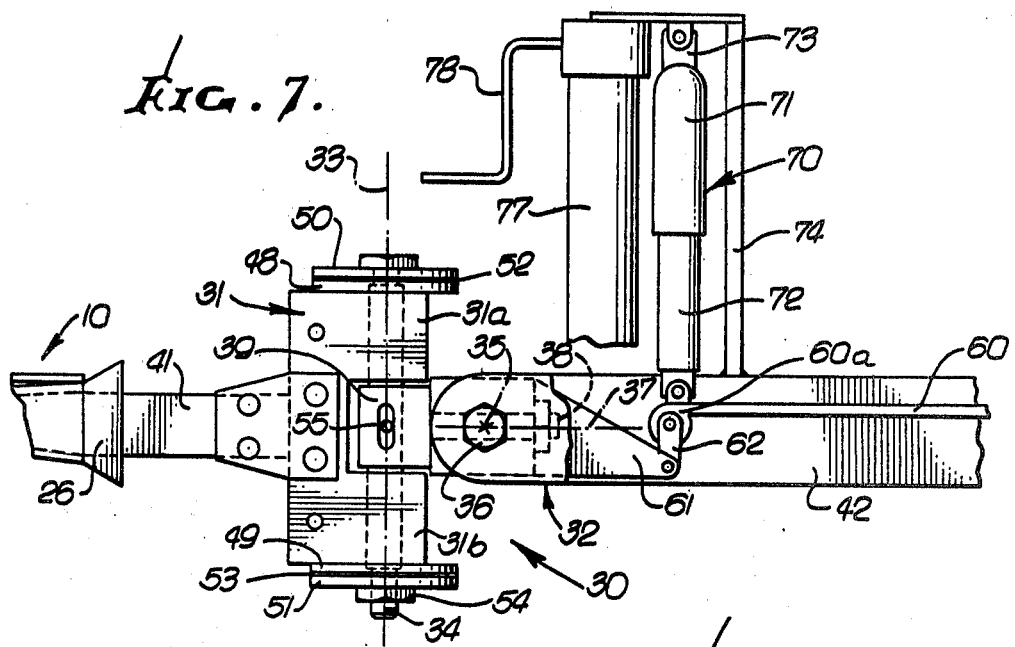
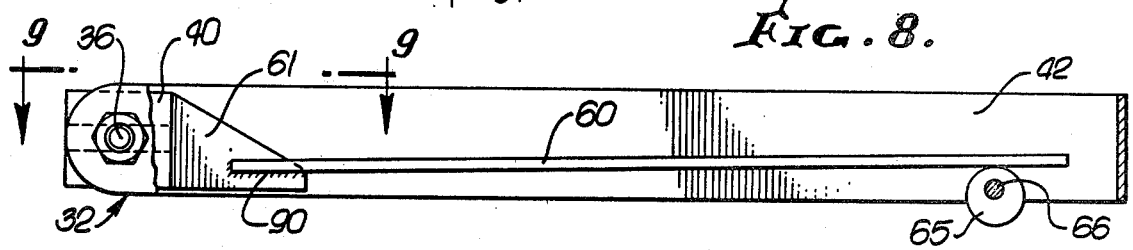
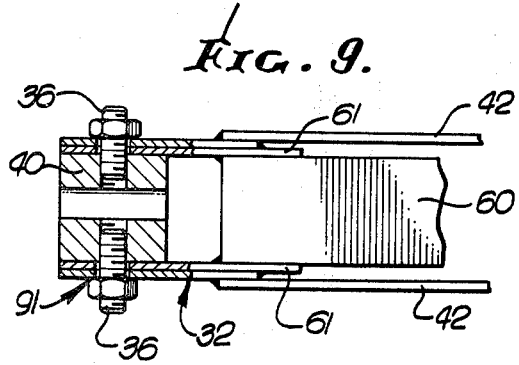
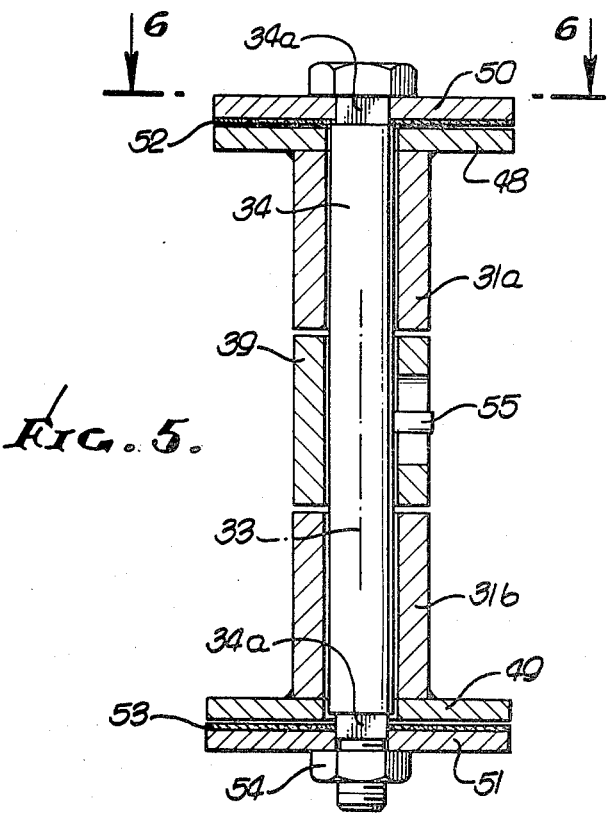
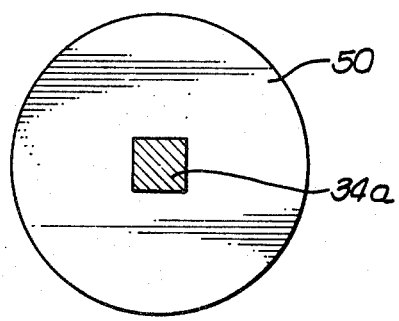

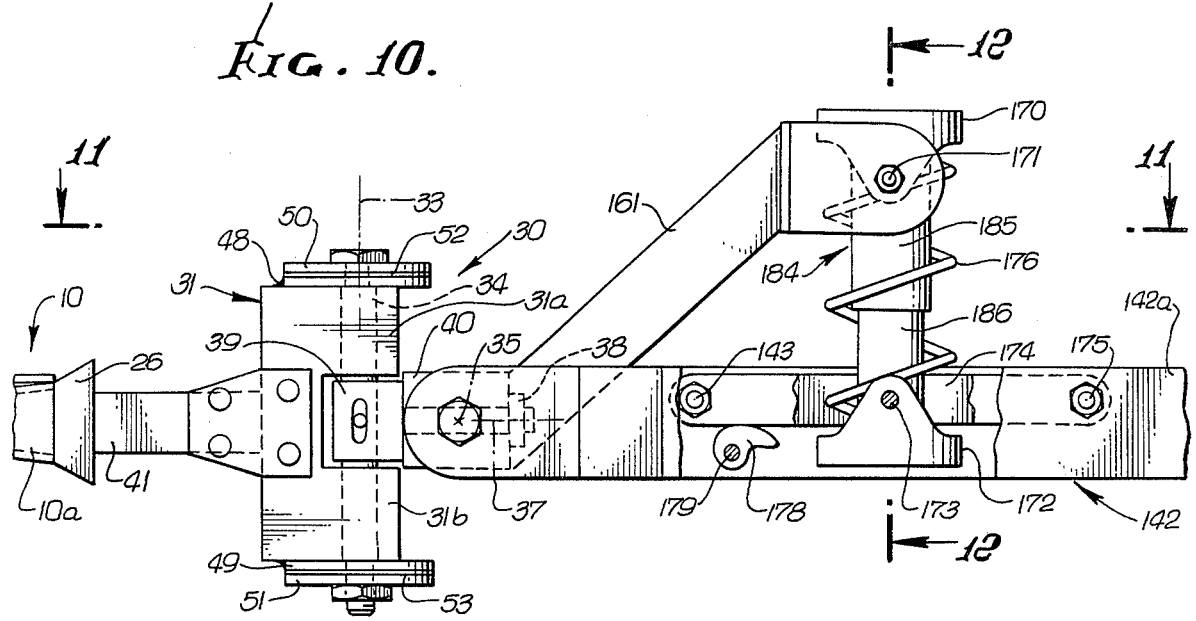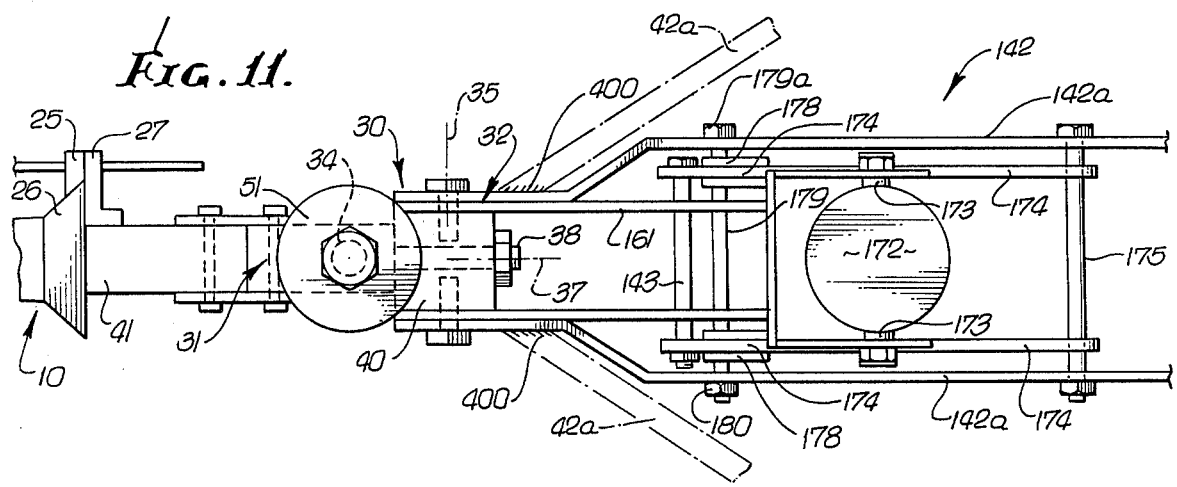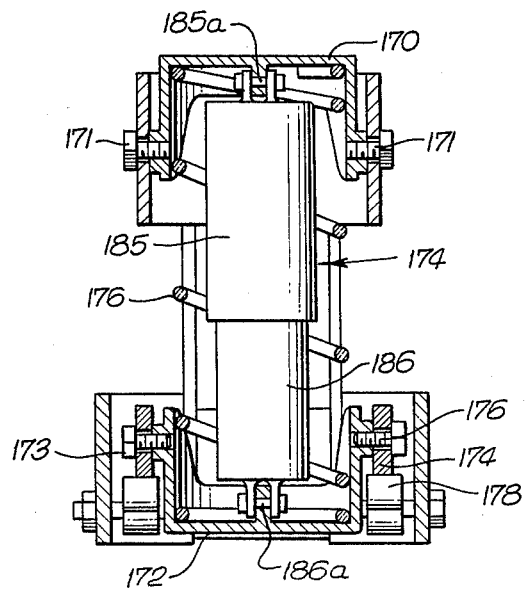

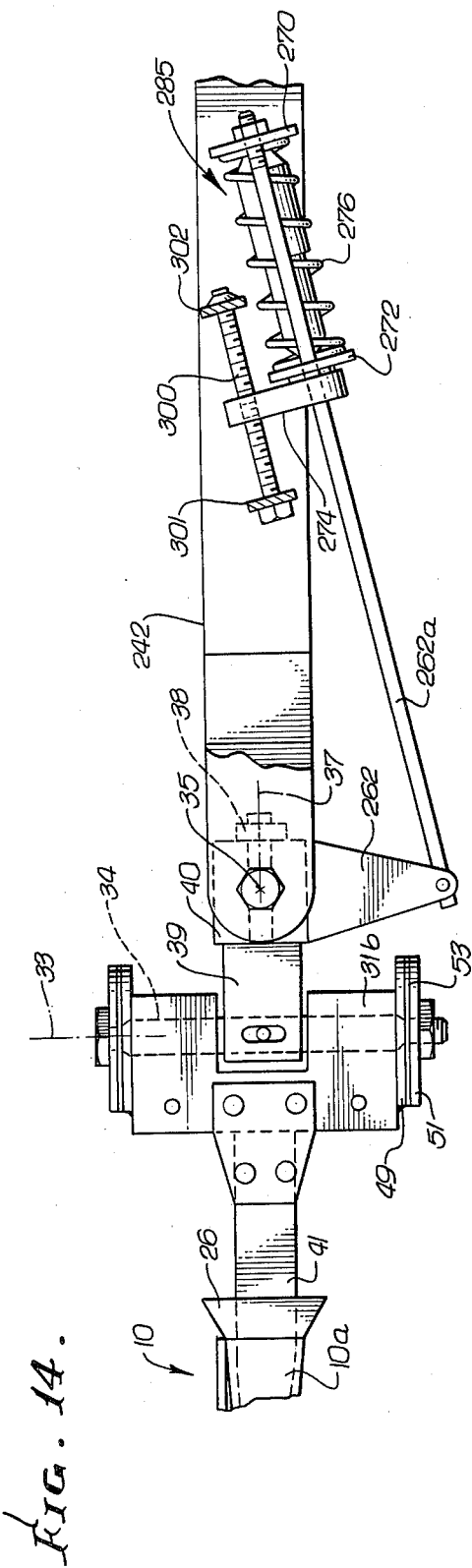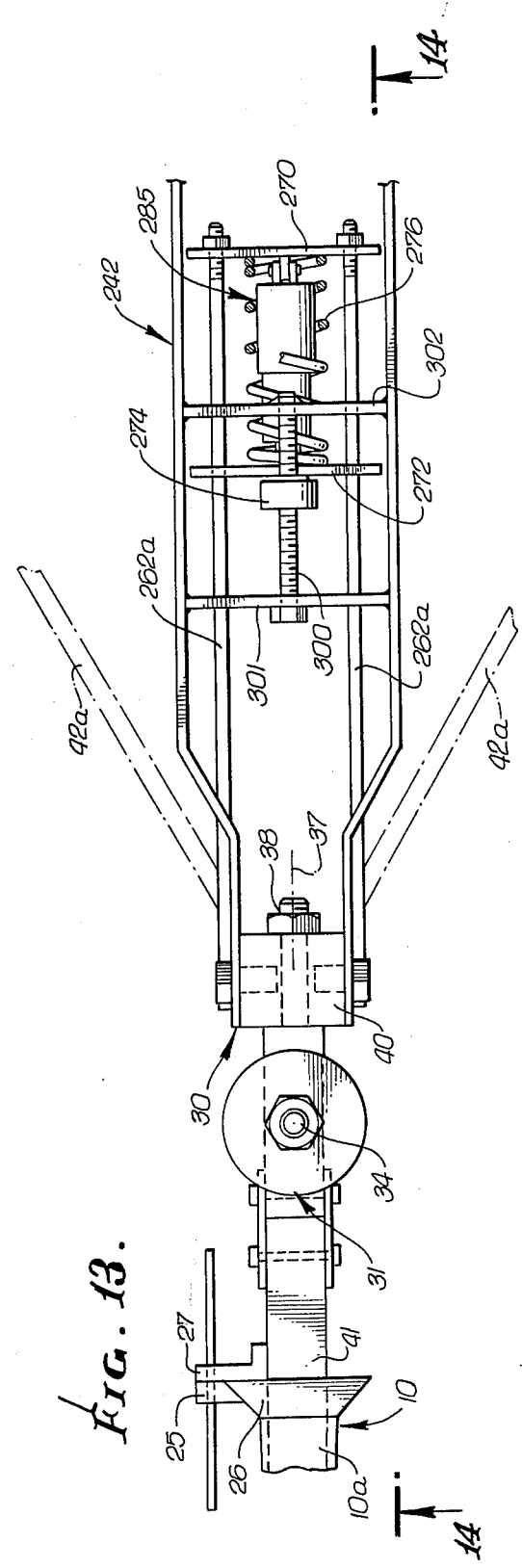

TRAILER HITCH

BACKGROUND OF THE INVENTION

This application is a continuation-in-part of my prior application Ser. No. 943,448 filed Sept. 18, 1978 and now U.S. Pat. No. 4,198,073.

This invention relates generally to trailer hitches, and more particularly concerns an improved hitch characterized as greatly simplifying the task of connecting towing and towed vehicles, and also by simple, rugged construction and by improved operation in use.

Conventional trailer hitches are relatively difficult to make up. As an illustration, one well known hitch requires the following steps:

1. Install trailer hitch ball and structural member into receiver on back of two vehicle;
2. Insert safety pin through trailer hitch ball assembly to hold secure in receiver;
3. Insert cotter key to hold safety pin in place;
4. Raise trailer socket with front jack on trailer;
5. Back car to trailer placing ball under socket;
6. Lower socket onto ball and lock in place;
7. Install both equalizer arms into trailer hitch ball and structural member;
8. Raise hitch and rear of car with jack;
9. Attach back ends of each equalizer bar to respective sides of trailer A-frame using steel bar for leverage;
10. Install safety chain from trailer to car hitch;
11. Insert electrical connection from trailer to car;
12. Connect trailer brake safety cable to car;
13. Install sway control bar between trailer and car hitch;
14. Insert cotter key at each end of sway bar to hold secure;
15. Tighten sway bar tension adjustment to desired pressure;
16. Lower hitch and rear of car with jack stressing equalizer bars and continue to raise jack to clear for pulling.

The above system includes four large steel components weighing 50 or 60 pounds. These are kept greasy at points of friction. All of them must be stored in the trailer storage compartment when not in use. That compartment is much better used for camping equipment, etc.

There are also three cotter keys and a safety pin that may be lost in the dirt or sand when camping in the country or at the beach. Also, each time the trailer is hitched or unhitched the components must be carried to or from the storage compartment and installed as previously described.

Also, step nine of the above procedure includes two 40 or 50 pounds lifts with a steel bar to attach the rear of the two equalizer bars with the proper tension. This is not a recommended exercise for the senior citizens who make up a large percent of the trailering public.

Despite the above the ball hitch was acceptable for towing trailers with less than 200 pounds trailer hitch weight, but, with the popularity of travel trailer towing trailer hitch weights ranging from 400 to 600 pounds are encountered. Rather than design a new system, manufacturers have glorified the ball and socket system with numerous cumbersome and greasy additional parts to satisfy the need for load equalization and sway control, all of which must be stored in the trailer or tow vehicle, carried to and from place of storage and assembled and disassembled each time the trailer is hitched and unhitched.

It is clear from the above that simplification is greatly to be desired. Also, prior hitches lacked many of the herein described features including sway damping, up-down motion damping, and improved weight adjustment means.

SUMMARY OF THE INVENTION

It is a major object of the invention to provide an improved trailer hitch that will require fewer connection steps; that is simple to use; and that affords substantial improvements and advantages in operation. Basically, the hitch is embodied in the following:

(a) universal joint means including first and second members, the joint means defining mutually orthogonal axes about which said members are relatively rotatable, (b) first frame structure connected to the first member and attachable to a towing vehicle, and second frame structure connected to the second member and attachable to a towed vehicle, and (c) weight adjustment means on the second frame structure operatively connected to the first frame structure via said joint means to adjustably displace the first frame structure up and down.

As will appear, the weight adjustment means advantageously includes a relatively long lever and a relatively short lever operatively connected to the relatively long lever, the relatively short lever operatively connected with the first member to displace same up and down in response to rocking of the relatively long lever, both levers pivotally connected to the second frame structure to provide mechanical advantage in said displacement of the first frame structure in response to said rocking of the long lever. Further, the second frame structure compactly and centrally mounts the weight adjustment means, as will be seen, and a manually displaceable part is provided to effect the adjustment rocking of the long lever which may be in the form of a leaf spring to yield as road load conditions vary.

In addition, first damper mechanism may be associated with the joint means to damp relative pivoting of the members about a vertical axis, to reduce trailer side sway relative to the towing vehicle; and second damping mechanism may be provided in association with the long lever and the second frame structure to dampen up-down motion transmission between the towing vehicle and the trailer due to varying road loads.

In other form of the invention, the adjustment means includes a coil type compression spring operatively connected between a lever and another part (which may comprise a second lever) as will be seen; and the damper may be located adjacent or within the compression spring, to provide a very compact design.

Additional objects and advantages include the provision of safety stem and receptacle interconnection between the hitch and towing vehicle; a retractable safety line or chain for a safety pin that interconnects the stem and receptacle; and a safety latch connection between the stem and receptacle.

These and other objects and advantages of the invention, as well as details of an illustrative embodiment, will be more fully understood from the following description and drawings, in which:

DRAWING DESCRIPTION

FIG. 1 is a top plan view of trailer hitch apparatus incorporating the invention;

FIG. 2 is a side elevation on lines 2—2 of FIG. 1;

FIG. 3 is an enlarged section taken in elevation on lines 3—3 of FIG. 1;

FIG. 4 is an enlarged section taken on lines 4—4 of FIG. 1;

FIG. 5 is an enlarged elevation taken in section on lines 5—5 of FIG. 2;

FIG. 6 is a plan view on lines 6—6 of FIG. 5;

FIG. 7 is a fragmentary elevation showing details of apparatus seen in FIG. 2;

FIG. 8 is an elevation showing a modification;

FIG. 9 is a plan view taken on lines 9—9 of FIG. 8;

FIG. 10 is a side elevation like FIG. 2, but showing a modification;

FIG. 11 is a top plan view like FIG. 1, but taken on lines 11—11 of FIG. 10;

FIG. 12 is an enlarged elevation taken in section on lines 12—12 of FIG. 10;

FIG. 13 is a view like FIG. 11 but showing a further modification; and

FIG. 14 is a side elevation taken on lines 14—14 of FIG. 13.

DETAILED DESCRIPTION

Referring to FIGS. 1-3, a trailer hitch receiver 10 is permanently mounted to the back of a tow vehicle. For this purpose, the receiver top wall 10a may be welded to structure 11 associated with the vehicle. The receiver is horizontally elongated, and has side, bottom and end walls 10b, 10c and 10d, as indicated. A receiver interior upper wall 10e is inclined downwardly and leftwardly to match the angularity of a hitch stem 12 leftwardly receivable into the receiver chamber 13, whereby a tapered interfit between the receiver and stem is achieved. Note in FIG. 3 the leftwardly tapered upper and lower walls 14 and 15 of the stem 12.

The receiver incorporates a latch 16 that holds the stem secured in position when the stem is inserted completely into the receiver. Note latch arm 17 pivoted at 18 to the receiver body, and carrying a latch dog 17a urged into the receiver, as by tension exertion by spring 19. The dog enters the receiver via opening 20 in wall thereof, to penetrate into a recess 21 in the stem, for retention purposes.

The receiver and stem also contain laterally aligned through openings 22 and 23 to receive a safety pin 24 for additional holding security. Pin 24 may be suitably retained in place. In addition, interfitting electrical connections are carried by the receiver 10 and stem 12, to automatically make-up when the stem is guided into the receiver by the tapered walls referred to. For example, a male electrical connection 25 may be carried on the right side of the receiver entry flare 26 (see FIG. 1), and a female electrical connection 27 may be carried on the right side of stem. The automobile electrical system is thereby automatically connected to the trailer electrical system. Note associated electrical cables 28 and 29.

In accordance with an important aspect of the invention, universal joint means (as at 30) is provided to include first and second members, as for example 31 and 32. The joint means defines mutually orthogonal axes, about which members 31 and 32 are relatively pivotable. Thus, for example, see vertical axis 33 defined by vertical bolt 34; lateral axis 35 defined by lateral trunnions 36; and longitudinal axis 37 defined by longitudinal connector 38. Connector 38 is integral with a first part 39 which swivels with vertical bolt 34. The latter extends downwardly through part 39, as is clear from FIG. 2, the upper and lower extents of bolt 34 retained by upper and lower extents 31a and 31b of member 31. Thus, part 39 swivels between extents 31a and 31b, and about axis 33. Connector 38 extends rearwardly through a second part 40 which is retained to member 32 by trunnions 36. Thus part 40 and member 32 may swivel about longitudinal axis 37, and member 32 may also swivel about lateral axis 35, relative to part 40.

First frame structure as at 41 is connected to the first member 31, and structure 41 may be considered to include stem 12, attachable to a towing vehicle as described above. Second frame structure as at 42 is connected to the second member 32, and is attachable to a towed vehicle or trailer, as for example by delta shaped frame components 42a.

Damper means is provided in association with the joint means 30 to damp relative pivoting of the two members 31 and 32 about at least one of the axes, i.e. vertical axis 35, for example, damping side sway of the trailer relative to the towing vehicle. That damping means typically may include first upper and lower horizontal flanges 48 and 49 integrally attached to member 31, second upper and lower horizontal flanges 50 and 51 attached to bolt 34, and friction discs or brakes 52 and 53 respectively between flanges 48 and 50 and between flanges 49 and 51. Note the flats 34a on the bolt end in FIG. 6, to connect to flange 50. When clamping force is increased as by tightening the nut 54 on the bolt, the damping resistance to trailer side sway is increased, and vice versa. Flange 51 may be connected to bolt 34 as is flange 50. Also, first part 39 is keyed at 55 to the bolt to rotate therewith about axis 33. Up-down bounce dampening is somewhat reduced by tightening trunnion bolts 36 to pressurize parts 32 and 40.

Accordingly, the joint means 30 provides four functions. These include relative turning of the towing vehicle and towed vehicles; side sway control (about vertical axis 33 as described); accommodation to swiveling about lateral axis 35 to allow for up and down movement of the hitch as required wherein the towing vehicle for example travels up or down a driveway or other incline or decline; and accommodation to swiveling about longitudinal axis 37 to allow for free relative "twisting" movement of the towing vehicle and trailer as when they travel on laterally uneven surfaces.

The invention also includes the provision of weight adjustment means on the second frame structure and operatively connected with the first frame structure, via or through the described joint means 30, to adjustably displace the first frame structure up and down. For example, the stem 12 may be forced down relative to the receiver by such weight adjustment means in order to properly distribute or shift trailer weight to the wheels of the towing vehicle (i.e. so the towing vehicle will not be improperly tilted via weight imposition by the towed vehicle through the hitch).

Such adjustment means may advantageously take the form of a relatively long lever (as for example steel leaf spring 60), and a relatively short lever (as at 61) operatively connected to the long lever by means of two shackles 62. The connection is such that the first member 31 and structure 41 are displaced up and down in response to rocking of the long lever 60. Lever 61 may be formed as rearwardly projecting arms integral with part 40 through which bolt 38 projects, so that part 40, bolt 38, part 39, member 31 and structure 41 including stem 12 pivot integrally up and down about axis 35 when lever 60 is rocked up and down. Lever 60 has pivotal fulchrum connection to second structure 42 via a pivot pin 64; also lever 60 is rocked by turning a positioning cam 65 which is located beneath the lever to engage its underside (see FIG. 4), and which is eccentrally pivoted at 66 to structure 42. An adjustment rod is provided at 67, as an extension of pivot 66, to rotate the cam. Other suitable lever pivoting means may be provided. The fact that the long lever 60 comprises a leaf spring allows springing action of that lever to provide "give" i.e. yieldable rocking movement of the first frame structure relative to the second frame structure under variable road loading conditions causing the towing and towed vehicles to differentially move up and down relative to one another.

Another damper mechanism is provided in associated with the long lever 60 and the second frame structure 42 to damp relative movement therebetween, and between the first and second members 31 and 32 about horizontal and lateral axis 35. As shown in FIGS. 2 and 7, such mechanism may advantageously include a shock absorber or motion damper 70 having cylinder and plunger parts 71 and 72. Cylinder 71 stands vertically and is connected at 73 to rigid support member 74 integral with second frame structure 42. Plunger 72 is connected to the end 60a of the lever 60 which is joined by shackles 62 to lever 61. Lever end 60a moves up and down as the stem moves down and up, leaf spring lever 60 and the damper 70 absorbing such motion. A ground engageable support 76 is movable up and down in support cylinder 77 which is also connected to member 74. Rotary handle 78 moves support 76 up and down, as by a rack and pinion drive in the cylinder 77.

Also provided is a safety line such as chain 80 connected at one end to safety pin 24. Means is provided on the second frame structure to retract that line when the pin 24 is disconnected from the stem and receptacle. Such means advantageously take the form in FIGS. 1 and 2 of a steel ball 81 at the end of the chain and within tube 82, a retracting cable 87 attached to the ball and wound on a reel 83 rotation of which is resisted by a torsion spring 85 in housing 86. An annular stop 86a limits extension of the ball 81 and cable 87. When the chain is disconnected from the towing vehicle, cable 87 rolls up on reel 83 to pull the chain into the tube 82, so it does not hang down or drag on the ground.

In the modification seen in FIG. 8, the long lever 60 has direct connection at 90 to the short lever, i.e. arms 61 of second part 40 pivoted at 91 to the second frame structure, as via trunnions 36.

A summary of the operations required to hitch the trailer to the tow vehicle with the described hitch is as follows:

1. Adjust the front of the trailer to the same height as the back of the tow vehicle by use of the trailer jack. (Should be very close already if trailer is standing level.)

2. Back tow vehicle to trailer so the trailer hitch receiver slides onto the trailer hitch stem and latches securely.

3. Insert safety pin (which is on end of safety chain) through receiver and stem and turn ¼ turn to lock position.

4. Raise trailer jack to clear for towing.

The sway control tension may be adjusted if necessary but should not have changed since last towing. The weight equalizer tension may be adjusted if necessary but should not have changed since last towing.

The safety chain was installed when the safety pin was installed because the chain is attached to the pin. Also the safety brake cable was attached at that time also because it is attached to the safety chain and doesn't require a separate operation to attach. The electrical connection was made when the hitch receiver made junction with the trailer hitch stem; it also doesn't require a separate operation to attach. It will be noted that there are no loose parts to carry, store or assemble, no small parts to loose, no greasy parts to handled, and no 40 or 50 pound lift to perform.

While there are comparatively fewer operations to perform when hitching up with the new hitch, it provides improvements in the operative functions of the presently used ball hitch; in addition up and down bounce control is added. Further, the new hitch has no loose parts to assemble, carry, store or become lost. It has no greasy parts to handle and includes no back straining lifts to perform. The hitch also cuts the present 10 and 15 minute hitch up time down to 1 or 2 minutes.

In FIGS. 10–12, the elements corresponding to those shown in FIGS. 1 and 2 bear the same numerals.

Second frame structure 142 is pivotally connected to the second member 32, as by bolt 36, and is also suitably attachable to a tower trailer or vehicle (as for example by delta frame components 42a). Elements 142 and 42a are typically welded together at 400 to pivot about axis 35.

The weight adjustment means shown in FIGS. 10 and 11 is somewhat modified, structurally; however, it continues to function by operative connection to the described joint means 30, to adjustably displace the first frame structure up and down.

Such modified adjustment means includes two like lever arms 161 integral with part 40 through which bolt 38 projects, so that part 40, bolt 38, part 39, member 31 and structure 41 including stem 12 pivot integrally up and down about axis 35 when lever arms 161 are rocked down and up, respectively. Like lever arms 161 project upwardly and rearwardly as shown to pivotally suspend an upper support cup 170 therebetween, pivot trunnions being shown at 171. A corresponding lower support cup 172 is pivotally suspended at 173 by like parallel lever arms 174, whereby the lower cup is adjustably movable up and down. Lever arms 174 are pivotally suspended by a bolt 175 extending horizontally between second frame structure parallel members 142a, whereby the generally horizontal crank arms 174 move the lower cup 172 up and down as the arms 174 are pivoted up and down. A vertically oriented compression type coil spring 176 fits between the upper and lower cups, whereby the lever arms 161 are yieldably and adjustably suspended. Accordingly, yieldable rocking movement of the first frame structure relative to the second frame structure is provided, to accommodate to variable road conditions causing the towing and towed vehicles to differentially move up and down relative to one another.

Lever arms 174 are adjustably rocked up and down by turning the positioning cams 178 located beneath the arms 174 to engage their undersides. Those cams are carried by a lateral bolt 179 extending between and carried by member 142a. When a nut 180 on bolt 179 is loosened, the bolt head 179a may be rotated to adjustably rotate the cams 178, and thereby adjust the vertical position of lower cup 172. Thereafter, the nut 180 may be tightened against adjacent member 142a. Note that lever 161 pivots counterclockwise upwardly, and lever 174 pivots clockwise upwardly.

Another damper mechanism is provided in association with the levers 161 and 174, and also with spring 176, to damp relative motion between the members 31 and 32 about horizontal and lateral axis 35. Such mechanism includes the shock absorber 184 having cylinder and plunger parts 185 and 186 confined between the two cups 170 and 172, and within the spring 176 as shown. Accordingly, space is saved, and the entire structure is more compact. FIG. 12 shows the pivotal connections at 185a and 186a of the cylinder and plunger parts to the two cups.

In FIGS. 13 and 14 the construction is like FIGS. 10-12 except that the coil spring 276 is operatively connected between a part 274 and the bell-crank lever 262. In this regard elongated rods 262a are pivotally connected to lever 262 and extend generally in the direction of frame structure 242 to carry a support 270. The coil spring 276 is confined between support 270 and a second support 272 against which part 274 bears.

The adjustment means also includes a manually adjustable component carried by the frame structure 242 to effect the adjustment shifting or rocking of the lever 262. That component is shown as a threaded component 300 having threaded connection to part 274, whereby rotation of component 300 advances or retracts the part 272 linearly, to linearly displace the spring 276. Brackets 301 and 302 connected to structure 242 carry the component 300. A damper or shock absorber 285 is confined within the spring 276, and between the two supports 270 and 272, as shown.

In FIGS. 10-14, air-type shock absorbers may be employed. Also, easy tension adjustment of the coil spring is facilitated.

I claim:

1. In a trailer hitch, the combination comprising
   (a) universal joint means including first and second members, the joint means defining mutually orthogonal axes about which said members are relatively rotatable, said axes including a generally vertical axis associated with the first member, and a generally lateral axis associated with the second member, there being a lever pivotally connected to said members to pivot the first member up and down about the lateral axis,
   (b) first frame structure connected to the first member and attachable to a towing vehicle, and second frame structure connected to the second member and attachable to a towed vehicle, and
   (c) weight adjustment means on the second frame structure operatively connected to the first frame structure substantially entirely through said lever and said first member to adjustably displace the first frame structure up and down by force transmission substantially entirely through the lever and said first member,
   (d) said adjustment means including another part and a compression spring operatively connected between said part and the lever, said part being adjustably shiftable to effect said rocking of the lever by motion transmission through the spring, said lateral axis being at the spring side of said vertical axis.

2. The combination of claim 1 wherein said second frame structure generally centrally mounts said adjustment means, rearwardly of said joint means.

3. The combination of claim 1 including disc brake damper mechanism associated with said joint means to damp relative pivoting of said members about one of said axes which extends generally vertically.

4. The combination of claim 3 wherein said mechanism includes a vertical bolt associated with said first member and a braking element to increasingly resist said relative pivoting of said members in response to tightening of said bolt.

5. The combination of claim 1 including damper mechanism associated with said lever and said second frame structure to damp relative movement therebetween, and between said first and second members about one of said axes which extends horizontally.

6. The combination of claim 5 wherein said mechanism includes a vertically extending shock absorber having plunger and cylinder components one of which is connected to said second frame structure and the other of which is connected to said lever.

7. The combination claim 1 including a receptacle attachable to a towing vehicle, and a stem integral with said first frame structure and receivable in said receptacle.

8. The combination of claim 7 including a locking latch releasably interconnecting said stem and receptacle.

9. The combination of claim 7 including a safety pin releasably interconnecting said stem and receptacle, a safety line connected to the pin, and means carried by the second frame structure to yieldably retract the line when the pin is disconnected from the stem and receptacle, the pin in connected condition being angled relative to said line to prevent pin disconnection.

10. The combination of claim 1 wherein said axes comprise three orthogonal axes including a vertical axis, a horizontally lateral axis, and a horizontally longitudinal axis extending between said first and second frame structures.

11. The combination of claim 1 wherein the spring comprises a coil spring, the adjustment means including a manually displaceable component carried by the second frame structure to effect said adjustment shifting of the lever.

12. The combination of claim 11 including damper mechanism operatively connected between the part and the lever.

13. The combination of claim 1 wherein said part includes a second lever, the spring extending generally upright between said two levers.

14. The combination of claim 11 wherein said component has threaded connection to said other part whereby rotation of said component shifts said part linearly to displace the spring.

* * * * *